UNITED STATES PATENT OFFICE 1,926,642

PROCESS OF OBTAINING REACTION PRODUCTS OF KETENE

Charles O. Young and George H. Reid, South Charleston, W. Va., assignors to Carbide & Carbon Chemicals Corporation, a corporation of New York No Drawing. Application December 12, 1930
Serial No. 502,005

8 Claims. (Cl. 260—106)

The invention is an improved process of making reaction products of ketene ($CH_2=C=O$). In general, the process of our invention comprises thermally decomposing a substance which will form ketene, and rapidly cooling the hot gaseous products of this pyrolysis in intimate contact with a reacting absorbing medium.

The principal object of the invention is to provide a method of making ketene and reaction products thereof which will result in the formation of a maximum amount of valuable product and which will minimize losses of the ketene formed.

In the manufacture of ketene by the pyrolysis of organic compounds, e.g., acetone, two primary difficulties in securing useful quantities of ketene have been encountered, namely; ketene decomposes easily at its formation temperature, and at ordinary temperatures it polymerizes rapidly in both the pure state and in inert solvents, yielding products from which it cannot easily be regenerated.

The first of the above enumerated objections has been largely overcome in the prior art by improved technique in manipulating the pyrolysis. The second, although equally as important, has received little or no attention. In all cases where it has been proposed to utilize ketene in an absorption system to form reaction products thereof, the hot vapors from the pyrolytic operation are condensed to remove acetone or other unchanged starting material, and the ketene is then passed to an absorption train. In this way a large amount of ketene dissolves in the condensed substance and rapidly polymerizes into a dark tarry mass. Further losses may be caused by polymerization in the conduit which conveys the ketene to the absorption train.

Our improved process obviates these prior difficulties, hence, its advantages will be apparent.

We prefer to practice our invention as follows:

Ketene is formed by the pyrolysis of acetone in a converter and the vapors from this converter are immediately quenched in a stream of the absorbing medium with which it is desired to have the ketene react. It is primarily essential to the process that the time elapsing between the removal of the hot vapors from the converter and their contact with the quenching medium be extremely short.

The quenching medium may be any reagent with which it is desired to have the ketene react, for example aniline, acetic acid, ethylene glycol monoethyl ether, alcohol or water may be used. This quenching or absorbing medium may be supplied in any desired manner, for example the apparatus for quenching the hot vapors may take the form of a packed tower scrubber, spray-scrubber or any other suitable means for rapidly cooling the hot vapors in intimate contact with the absorbing medium.

The absorption or quenching means may be operated at ordinary temperatures, and in such a case the resultant liquid will contain the reaction product of ketene and the absorbing medium, excess absorbing medium and condensed unchanged acetone. The liquid may be circulated until sufficiently reacted with ketene and then separated from the diluent acetone, or it may be otherwise treated for the separation or recovery of its several constituents.

The process may be successfully practiced by operating the quenching device at a temperature which will not cause the acetone to condense, but which will permit the unconverted acetone to pass off as a gas where it may be easily recovered. This procedure is preferable in certain instances, inasmuch as it avoids dilution of the absorbing medium with acetone.

The invention is not limited to the formation of reaction products from ketene produced in the manner set forth, but includes the utilization, by the method described herein, of ketene which is produced by any equivalent means.

We claim:

1. A process of obtaining reaction products of ketene which comprises immediately passing substances formed by pyrolysis of organic substances which yield decomposition products including ketene, into a quenching stream of an absorbing medium which is reactive with ketene.

2. A process of obtaining reaction products of ketene which comprises thermally decomposing organic compounds which yield substances including ketene and rapidly cooling the products of pyrolysis in intimate contact with an absorbing medium which is reactive with ketene.

3. A process of obtaining reaction products of ketene which comprises immediately passing the substances formed by the pyrolysis of acetone into a quenching stream of an absorbing medium which is reactive with ketene.

4. A process of obtaining reaction products of ketene which comprises pyrolytically treating acetone and rapidly cooling the products obtained thereby in intimate contact with an absorbing medium which is reactive with ketene.

5. A process of obtaining the acetate of ethylene glycol monoethyl ether which comprises immediately passing the substances formed by the pyrolysis of acetone into a quenching stream of ethylene glycol monoethyl ether.

6. A process of obtaining the acetate of ethylene glycol monoethyl ether which comprises immediately passing the substances formed by the pyrolysis of acetone into a quenching stream of ethylene glycol monoethyl ether at a temperature such that any unchanged acetone in the mixture will remain in the gaseous state.

7. A process of obtaining acetic anhydride which comprises immediately passing the substances formed by the pyrolysis of acetone into a quenching stream of acetic acid.

8. A process of obtaining acetic anhydride which comprises immediately passing the substances formed by the pyrolysis of acetone into a quenching stream of acetic acid at a temperature such as to cause any unchanged acetone in the mixture to remain in the gaseous state.

CHARLES O. YOUNG.
GEORGE H. REID.